(12) United States Patent
Voeller et al.

(10) Patent No.: US 7,355,687 B2
(45) Date of Patent: Apr. 8, 2008

(54) METHOD AND APPARATUS FOR VEHICLE SERVICE SYSTEM WITH IMAGING COMPONENTS

(75) Inventors: David Voeller, St. Louis, MO (US); Joel Clasquin, Edwardsville, IL (US); Michael W. Douglas, St. Charles, MO (US)

(73) Assignee: Hunter Engineering Company, Bridgeton, MO (US)

( * ) Notice: Subject to any disclaimer, the term of this patent is extended or adjusted under 35 U.S.C. 154(b) by 161 days.

(21) Appl. No.: 10/783,609

(22) Filed: Feb. 20, 2004

(65) Prior Publication Data
US 2004/0165180 A1    Aug. 26, 2004

Related U.S. Application Data

(60) Provisional application No. 60/448,679, filed on Feb. 20, 2003.

(51) Int. Cl.
G01C 1/00 (2006.01)

(52) U.S. Cl. .................................. 356/139.09

(58) Field of Classification Search ............ 356/139.09
See application file for complete search history.

(56) References Cited

U.S. PATENT DOCUMENTS

| | | | |
|---|---|---|---|
| 2,731,834 A | | 1/1956 | Fehr et al. |
| 3,076,342 A | | 2/1963 | Hilgers |
| 3,102,429 A | | 9/1963 | Hardy et al. |
| 3,741,016 A | | 6/1973 | Hofmann |
| 4,337,581 A | * | 7/1982 | Eck .............................. 33/288 |
| 4,341,119 A | | 7/1982 | Jackson et al. |
| 4,576,044 A | | 3/1986 | Boni |
| 4,584,469 A | * | 4/1986 | Lovalenti ................ 250/223 B |
| 4,723,445 A | * | 2/1988 | Ripley et al. ............... 73/146.3 |
| 4,939,941 A | | 7/1990 | Cellucci et al. |
| 5,054,918 A | * | 10/1991 | Downing et al. ....... 356/139.09 |
| 5,189,912 A | | 3/1993 | Quinlan et al. |
| 5,396,436 A | | 3/1995 | Parker et al. |
| 5,684,578 A | * | 11/1997 | Nower et al. ............. 356/141.3 |
| 5,827,964 A | | 10/1998 | Douine et al. |
| 5,915,274 A | | 6/1999 | Douglas |
| 6,069,966 A | * | 5/2000 | Jones et al. .................. 382/100 |
| 6,085,428 A | * | 7/2000 | Casby et al. ................... 33/286 |
| 6,122,957 A | | 9/2000 | Bux et al. |
| 6,173,213 B1 | * | 1/2001 | Amiguet et al. ............ 700/230 |

(Continued)

FOREIGN PATENT DOCUMENTS

EP    0565320    10/1993

OTHER PUBLICATIONS

Hunter Engineering Company Copyright 1998- Operation Instructions for TC3500 Tire Changer—Form No. 4352T—77 pages.

(Continued)

*Primary Examiner*—Thomas H. Tarcza
*Assistant Examiner*—Luke Ratcliffe
(74) *Attorney, Agent, or Firm*—Polster, Lieder, Woodruff & Lucchesi, L.C.

(57) ABSTRACT

An improved vehicle wheel service system for servicing a vehicle wheel assembly, configured with one or more imaging sensors to accurately measure distances, dimensions, and characteristics of features associated with a vehicle wheel assembly undergoing a service.

18 Claims, 10 Drawing Sheets

U.S. PATENT DOCUMENTS

| | | |
|---|---|---|
| 6,244,108 B1 | 6/2001 | McInnes et al. |
| 6,323,942 B1 | 11/2001 | Ramji |
| 6,396,397 B1 | 5/2002 | Bos et al. |
| 6,535,275 B2 | 3/2003 | McCaffrey et al. |
| 6,535,281 B2 | 3/2003 | Conheady et al. |
| 6,619,362 B2 | 9/2003 | Corghi |
| 6,805,004 B2 | 10/2004 | Corghi |
| 6,822,582 B2 * | 11/2004 | Voeller et al. ............... 340/933 |
| 6,862,544 B1 * | 3/2005 | Merrill ........................ 702/95 |
| 2002/0000121 A1 * | 1/2002 | Carter et al. ................... 73/459 |
| 2002/0018218 A1 * | 2/2002 | Conheady et al. .......... 356/602 |
| 2004/0050159 A1 | 3/2004 | Corghi |
| 2004/0051864 A1 | 3/2004 | Braghiroli |
| 2005/0052657 A1 | 3/2005 | Braghiroli |
| 2005/0052658 A1 | 3/2005 | Braghiroli |
| 2005/0055153 A1 | 3/2005 | Braghiroli |
| 2005/0132786 A1 | 6/2005 | Cullum |
| 2005/0165509 A1 | 7/2005 | Braghiroli |

OTHER PUBLICATIONS

Hunter Engineering Company Copyright 1997—2002—Operations Instructions for GSP9700 Series Vibration Control System—(Software Version 3.0)—Form No. 4202T—126 pages.

* cited by examiner

METHOD AND APPARATUS FOR VEHICLE SERVICE SYSTEM WITH IMAGING COMPONENTS

CROSS-REFERENCE TO RELATED APPLICATIONS

The present application is related to, and claims priority from, U.S. Provisional Patent Application Ser. No. 60/448,679 filed on Feb. 20, 2003.

STATEMENT REGARDING FEDERALLY SPONSORED RESEARCH

Not Applicable.

BACKGROUND OF THE INVENTION

The present invention related generally to automotive service equipment adapted for the servicing of vehicles and vehicle components, such as vehicle wheel alignment systems, vehicle wheel balancing systems, vehicle tire changing systems, and vehicle brake testing systems, and specifically to automotive service equipment utilizing imaging technology to accurately measure distances, dimensions, and characteristics when servicing vehicles or vehicle components.

Conventional optical imaging technology utilizes an image sensor or camera to acquire a two-dimensional image of a target object. The two-dimensional image is typically composed of an array of image pixels, with each pixel having a value associated therewith corresponding to optical energy received at a discrete location on the image sensor or camera. Processing of the resulting two-dimensional image may be utilized to acquire accurate measurements of a target object in two dimensions, i.e. along the X-axis and Y-axis, but typically provides only limited information associated with a third dimension, i.e. along the Z- or distance axis.

Recent advances in three-dimensional imaging technology enable distance measurements along the Z-axis to be acquired for each pixel received in a two-dimensional image. For example, this technology is demonstrated by enabling virtual keyboard layouts to be projected onto any flat surface. The keyboard pattern is optimized for usability, featuring wide key spacing to improve typing accuracy, shortcut keys for popular applications, and adjustable brightness levels. The system includes a three-dimensional imaging sensor disposed behind a suitable lens which is configured to detect light projected from an infrared light source reflecting off a user's fingers as virtual keys are pressed. Associated software objects for controlling and utilizing data acquired by the three-dimensional imaging sensor is available for a wide variety of conventional personal computer and PDA operating systems. Data acquired by the three-dimensional imaging sensor is communicated to a host computer in a conventional manner, such as via either an RS-232 communications port or a USB interface.

Three-dimensional imaging technology provides the ability to accurately measure distances along a Z axis between the sensor and a target object, as well as provide conventional two-dimensional X and Y coordinates for features of a target object. Currently, sensors utilizing three-dimensional imaging technology locate objects in three-dimensional space at a rate of up to, or exceeding, 30 frames per seconds (fps). The three-dimensional imaging sensors require optical energy of a known wavelength to be reflected off the target objects undergoing three-dimensional imaging. All of the image processing to identify each pixel composing an image in an X, Y, and Z coordinate system is done in a logic circuit associated with the sensor element.

To measure the distance of a target object from a camera or sensor using Time Of Flight (TOF) three dimensional imaging, optical energy is directed towards the target object, and is correspondingly reflected from the target object back to the camera or sensor along individual pathways. The TOF for optical energy traveling along a first pathway is different than the TOF for optical energy traveling along other pathways. Additional information which can be accurately acquired from the camera or sensor utilizing an array of sensing elements includes placement of the target object along the X and Y axis of a three-dimensional coordinate system.

Alternative methods of determining dimensions of an object in an image are known in addition to the TOF three-dimensional imaging technology described above. For example, it is known to examine luminosity data from the reflection of optical energy off the target object. Pixels composing a resulting two-dimensional image which are darker are presumed to be further away than lighter pixels.

Structured light may be utilized to acquire distance measurements to a target object. A planar light beam may be directed towards the target object along a highly accurate and known angle. The light received from the associated reflections off the target can be used in conjunction with the known angle to determine a distance from receiver to target by using trigonometry. This method has been shown in vehicle service system applications in U.S. Pat. No. 5,054,918 to Downing et al. for "Light Scanning System For Measurement of Orientation and Physical Features Of A Workpiece."

Acoustical measurement is commonly used in many applications today. The use of acoustical measurement in combination with a vehicle wheel balancing system is illustrated in U.S. Pat. No. 5,189,912 to Quinlan et al. for "Ultrasonic Wheel Measuring Apparatus and Wheel Balancer Incorporating Same."

Yet another method to determine x, y, z dimensions from objects in an image is to use a technique like that used in machine vision vehicle wheel alignment sensors. Machine vision vehicle wheel alignment sensors are configured with a predetermined optical target containing several points in known locations which is manufactured with an extremely high degree of accuracy. An image of the target in three-dimensional space is acquired by a camera system. A mathematical duplicate of the target is then constructed to correspond to the acquired image, by solving spatial positioning equations have six unknown variables. These variables include displacement within an X, Y, and Z coordinate system, and the yaw, pitch, and roll of the target within the coordinate system. Because the relationship between points on the target surfaces are known to a high degree of accuracy, the mathematical duplication of the target identifies the position and orientation of the target in three dimensional space relative to the observing camera.

It is further known to utilize two or more imaging sensors to acquire stereoscopic images of a target object from which positional and dimensional information may be acquired. However, the stereoscopic approach is complicated because multiple imaging sensors or cameras are used to gather distance information instead of one imaging sensor. In a stereoscopic system, each imaging sensor or camera consists of an imaging element, a means to control the imaging element, and a means to communicate acquired images from the imaging element to a processing means where the images are processed to determine distances from the imaging sensors to the target object. A lens assembly is optionally included between the imaging element and the target object to improve the reception of optical energy reflected from the target object. Similarly, an optical energy source or emitter means may be provided to improve illumination of the target object.

Accordingly, it would be advantageous to provide an improved vehicle wheel service device, such as a vehicle wheel balancing system or a vehicle tire mounting system which is configured with one or more imaging sensors to acquire dimensional information associated with a vehicle or vehicle component undergoing service, and to utilize the acquired dimensional information to assist in completing a vehicle wheel service procedure.

For example, conventional vehicle wheel balancer systems perform a calculation known in the trade as "plane separation" which separates sensed vibrations into discrete imbalance masses disposed in two separate planes of a vehicle wheel assembly, consisting of a wheel rim and a tire. These planes are typically axial planes corresponding to the wheel rim edges (i.e., the placement location of clip-on imbalance correction weights), but can also be planes located between the wheel rim edges (i.e., the placement location for adhesive weights). In order to calculate proper imbalance correction weight sizes, the axial location and radial location of the planes must be known. The "plane separation" calculations are described in further detail in U.S. Pat. Nos. 2,731,834, 3,076,342, and 3,102,429.

Known methods to measure the parameters of a vehicle wheel rim for purposes of identifying the axial and radial location of imbalance correction weight placement planes include the use of manual calipers, mechanical arms connected to sensors, such as shown in U.S. Pat. Nos. 4,939,941, 4,341,119, 4,576,044, and 3,741,016, acoustical measurement techniques, such as shown in U.S. Pat. No. 5,189,912, and the use of structured light, such as shown in U.S. Pat. No. 5,054,918.

The imbalance correction weights used on today's wheel balancers include clip-on imbalance correction weights that are clipped onto the edge of a wheel rim, adhesive imbalance correction weights which are located axially inward from an edge of the wheel rim and adhered on an inside exposed surface of the wheel, and adhesive patch imbalance correction weights commonly used to correct large imbalances and which are located on an inner surface of the tire. Commonly, these options are presented to an operator on a display screen, requiring the operator to manually inspect the vehicle wheel rim to determine which type of imbalance correction weight is most appropriate.

Accordingly, it would be advantageous to provide an improved vehicle wheel service device, such as a vehicle wheel balancing system or a vehicle tire mounting system which is configured with one or more imaging sensors to acquire information associated with a vehicle wheel undergoing service, and to utilize the acquired information to assist in identifying suitable imbalance correction weight placement planes and imbalance correction weight types for a vehicle wheel undergoing an imbalance correction procedure.

During vibration reduction procedures for a vehicle wheel assembly, it is often necessary to measure the radial runout present in the surfaces on a wheel rim against which a tire is seated, i.e. the tire bead seat surfaces. For a wheel assembly having a wheel rim constructed from steel, it is often adequate to measure the radial runout of the inboard and outboard tire bead seats on the corresponding outer edges of the wheel rim because the steel wheel rim is formed in a single process which establishes a good correlation between the outer edges and the bead seat surfaces. However, for a wheel assembly having a wheel rim constructed from an alloy, the outer edges of the wheel rim and the bead seat surfaces are often formed during different machining steps. Variations can occur in radial runout between the outer edges and the bead seats surfaces. Hence, for alloy wheel rims a direct measurement of the inside bead seat surfaces provide the most accurate measure of radial runout.

With conventional vehicle wheel balancer systems measurement of an inner surface of the bead seats on a wheel rim requires a tedious and time consuming process. First, the wheel assembly must be removed from the vehicle wheel balancer system. Next, the tire is removed from the wheel rim using a vehicle tire changing system, the wheel rim (without the tire present) is remounted on the vehicle wheel balancer system, and radial runout at the bead seat surfaces is measured. The wheel rim is then removed from the vehicle wheel balancer system, and returned to the vehicle tire changing system, wherein the tire is remounted to the wheel rim matching a measured first harmonic high spot of the tire with an average first harmonic low spot of the wheel rim to decrease vibration in the wheel. Finally, the complete wheel assembly is again returned to the vehicle wheel balancing system to complete the balancing process utilizing the acquired bead seat radial runout information.

Accordingly, it would be advantageous to provide an improved vehicle wheel balancing system with a means to acquire bead seat radial runout information from the inner surfaces of a wheel rim bead seat without requiring complete removal and disassembly of the vehicle wheel assembly from the vehicle wheel balancing system.

BRIEF SUMMARY OF THE INVENTION

Briefly stated, the present invention provides an improved vehicle wheel service system having a central processing unit and which is configured to support a vehicle wheel assembly consisting of at least a vehicle wheel rim on a rotating support structure. The vehicle wheel service system includes an imaging sensor assembly disposed to acquire one or more optical images of at least a portion of the vehicle wheel assembly. The imaging sensor is further configured to acquire distance information associated with each of the acquired optical images. The central processing unit is configured to receive the distance information from the imaging sensor assembly and to utilize the distance information to facilitate one or more vehicle wheel service procedures.

In a first alternate embodiment of the present invention, a vehicle wheel balancing system is configured with an imaging sensor assembly to acquire optical images and dimensional information associated with a vehicle wheel assembly consisting of at least a vehicle wheel rim undergoing a vehicle wheel balancing procedure. The imaging sensor acquires dimensional information associated with one or more features of the vehicle wheel assembly, including, but not limited to, radial runout of the rim bead seat surfaces, lateral runout of the wheel rim, tire characteristics and defects, wheel rim surface defects, wheel rim configurations and profiles, and imbalance correction weight placement locations. The vehicle wheel balancing system is configured to utilize the acquired dimensional information to assist an operator in completing a vehicle wheel balancing procedure.

In an alternate embodiment of the present invention, a vehicle tire changing system is configured with one or more imaging sensors assemblies to acquire optical images and dimensional information associated with a vehicle wheel assembly consisting of at least a vehicle wheel rim onto which a tire is to be mounted or dismounted The imaging sensor acquires dimensional information associated with one or more features of the vehicle wheel assembly, including, but not limited to, radial runout of the rim bead seat surfaces, lateral runout of the wheel rim, tire characteristics and defects, wheel rim surface defects, wheel rim configurations and profiles, and the presence of installed tire pressure sensors. The vehicle tire changing system is configure to utilize the acquired dimensional information to assist an operator in completing a tire mounting or dismounting procedure, and optionally, to store or convey the acquired dimensional information for use by a vehicle wheel balancing system in a subsequent wheel balancing procedure associated with the vehicle wheel assembly.

Briefly stated, the three-dimensional technology is used to improve several functions of wheel balance and tire changing equipment. The improvements include wheel balancer improvements to measuring radial and lateral rim runout, determining imbalance correction weight locations, placing imbalance correction weights, and the automation of a balancer bead breaker used to unseat the tire bead from the rim bead seat. Also, some of the same improvements to the wheel balancer will be applied to the tire changer.

In an alternate embodiment, the methods of the present invention facilitate the process of balancing and matching a wheel rim and tire of a wheel assembly on a single vehicle wheel service system by providing measures of the rim and tire radial runout and tire non-uniformities during the process of displacing the tire from a bead seat surface of the wheel rim.

The foregoing and other objects, features, and advantages of the apparatus and methods of the present invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

Figure 1:
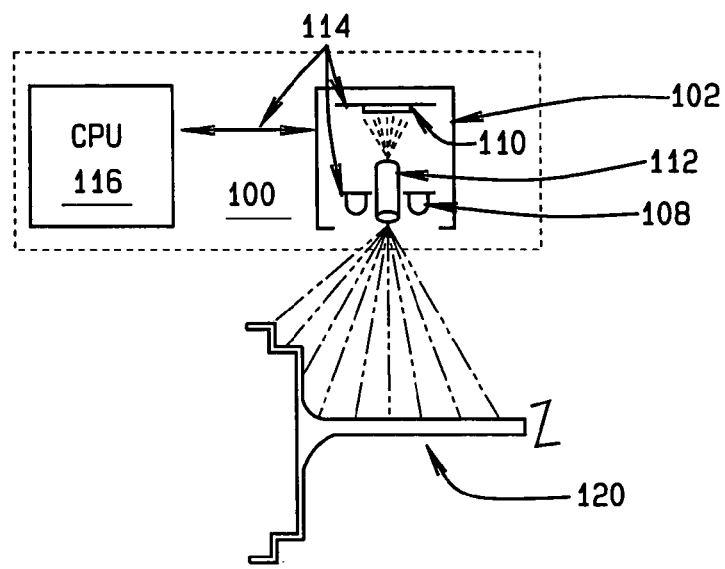
FIG. 1 illustrates a preferred camera component configuration of the present invention.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

The present invention is described below in the context of an improved vehicle wheel service system 100, such as a vehicle wheel balancer system 200 or a vehicle tire changing system 400, configured with one or more imaging sensor assemblies 102 which are configured to acquire one or more images of a field of view. The acquired images are used for locating, measuring distances to, and identifying features or target objects, and more particularly, vehicle wheel features, vehicle wheel feature locations, vehicle wheel configurations, dimensions, and distances from features of a vehicle wheel to the imaging sensor assembly 102. For example, the imaging sensor assembly may be disposed to provide an optical distance measurement to a tread surface of a tire, identifying tire flat spots, bulges, or providing a measure of the tire tread depth.

As shown in FIG. 1, each imaging sensor assembly 102 preferably consists of an optical energy source 108 configured to emit optical energy at a known wavelength, an imaging sensor 110, and a lens assembly 112 configured to focus reflected optical energy onto the imaging sensor 110. The imaging sensor 110 is preferably a two-dimensional array of light sensing elements configured to generate a signal representative of distances between each sensing element and a feature or target object in addition to a signal representative of the optical energy received at each sensing element (i.e., an image consisting of discrete pixels corresponding to each sensing element in the image sensor 110).

Alternatively, two or more imaging sensor assemblies 102 may be utilized to acquire multiple images of a target object for purposes of stereoscopic distance measurements. For such alternative embodiments, each imaging sensor 110 may be a conventional two dimensional array of light sensing elements configured to generate a signal representative only of the optical energy received at each sensing element (i.e., an image).

Figure 2:
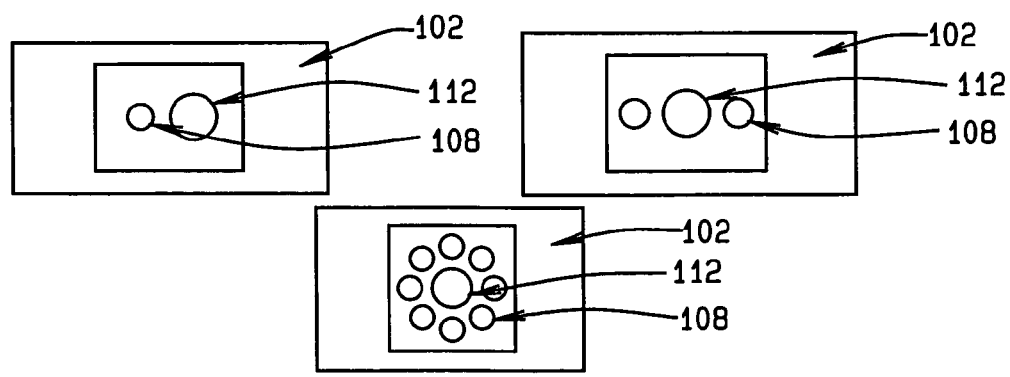
FIG. 2 illustrates alternate camera component configurations of the present invention.

As illustrated in FIG. 2, the imaging sensor assembly 102 may be configured in a variety of different configuration, depending upon the particular application for which it will be utilized. Preferably, each optical energy source 108 associated with a particular imaging sensor assembly 102 is configured to emit optical energy at the same wavelength. If multiple imaging sensor assemblies 102 are employed in a single vehicle service device 100, it is preferable that the optical energy sources 108 associated with each imaging sensor assembly 102 emit optical energy at different wavelengths, to facilitate distinguishing reflected light between each imaging sensor assembly 102.

Each imaging sensor assembly 102 further includes a conventional communication means 114 such as, but not limited to, a CCA trace, USB controller, Firewire controller or 802.11 HF transceiver to transfer captured images and distance data to a processing unit 116 associated with the vehicle service system 100. Optionally, image processing is done in a camera logic circuit associated with the imaging sensor assembly 102, and the communication means 114 is configured to transfer processed image data along with, or instead of, the raw image data to the processing unit 116.

When associated with vehicle service system 100, the imaging sensor assembly 102 may be located in a variety of different locations depending upon the particular application for which the imaging sensor assembly 102 is to be utilized, and one or more parameters of the imaging sensor assembly 102, including but not limited to durability, stability, focal length of the lens 112, Field Of View (FOV) of the lens 112, intensity of optical energy emitted from the optical energy source 108, and limitations of the imaging sensor 110.

Figure 3A:
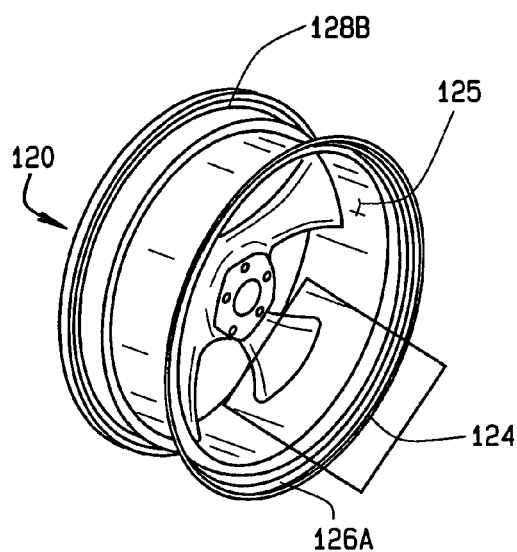
FIG. 3A illustrates an inner view of a vehicle wheel rim.

For applications which require the imaging sensor assembly 102 to view a vehicle wheel assembly 118, consisting of a wheel rim 120 and tire 122, there are a variety of surfaces on the vehicle wheel assembly 118 which are of interest. For example, as shown in FIG. 3A, with a tire 122 mounted or dismounted, it is desirable to include in a field of view, the inner rim lip 124 to identify potential clip-on imbalance correction weight locations, nominal rim dimensions or profiles, the inner surface profile 125 of the wheel rim 120 for adhesive imbalance correction weight size and location determinations, and the underside 126A of the inner tire bead seat 128A to assist in a determination of radial and lateral runout.

Figure 3B:
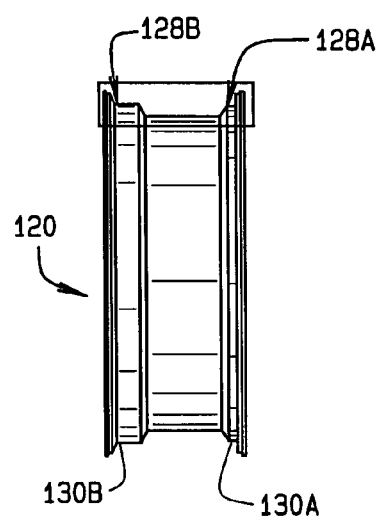
FIG. 3B illustrates a side view of a vehicle wheel rim.

As shown in FIG. 3B it is desirable to include in a field of view, the upper surfaces 130A, 130B of the inner and outer tire bead seats 128A, 128B with the tire 122 removed or dismounted to assist in a determination of radial and lateral runout.

Figure 3C:
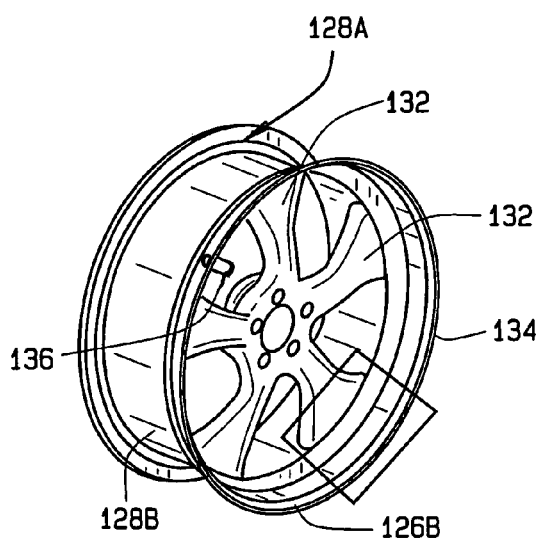
FIG. 3C illustrates an outer view of a vehicle wheel rim.

As shown in FIG. 3C, it is desirable to include in a field of view the spokes 132 of the wheel rim 120 to determine hidden imbalance correction weight placement locations, as well as the outer wheel rim 134 for clip-on imbalance correction weight type, size, and location determination and nominal rim dimensions. Those of ordinary skill will recognize that the spokes 132 may also be observed from the inside as shown in FIG. 3A, to determine a rear spoke cross-section for placement of imbalance correction weights within the spoke cross-section, obscuring views of the imbalance correction weight after placement from the outside of the wheel assembly 118.

It is further desirable to view the underside 126B of the outer bead seat 128B (while the tire is mounted or dismounted) to assist in a determination of radial and lateral runout, and to view the outer rim surface 134 for adhesive weight placement locations. The outer portions of the wheel rim 120 may optionally be viewed to locate other features such as a valve stem 136 or temporary index markings so that the wheel assembly 118 may be rotated to a convenient location for inflation or to automatically re-phase the wheel rim 120 and tire 122.

For any field of view including a portion of a vehicle wheel assembly 118 acquired by a camera or image assembly 102, obstructions to the smooth surfaces of the wheel rim 120 such as balance weights (not shown), spokes 132, or valve stems 134, may be identified in resulting images utilizing conventional image processing techniques. The obstruction information is utilized to assist in identifying suitable imbalance correction weight types and placement locations, relocating one or more imbalance correction balance weights, or altering an amount of imbalance correction weight installed on the vehicle wheel assembly 118.

For example, if an imbalance correction weight placement location is obstructed by the presence of debris or a surface defect on the wheel rim 120, conventional wheel balancer systems are not capable of automatically identifying the presence of the debris or obstruction to identify alternate imbalance correction weight placement locations and sizes. By identifying debris or obstructions in an image of a wheel rim 120 acquired by an imaging sensor assembly 102, a vehicle wheel service system 100, such as a vehicle wheel balancer 200 may be configured to automatically utilize a split weight algorithm to identify suitable alternative imbalance weight placements and sizes. Similarly, the imaging sensor assembly 102 may be utilized to facilitate placement of imbalance correction weights behind individual spokes 132 or within spoke cross-sections of the vehicle wheel assembly 118.

The particular location for placement of an imaging sensor assembly 102 on a vehicle wheel service system 100 such as a vehicle wheel balancer 200 or vehicle wheel tire changer 400 is determined in part by the optical characteristics of the imaging sensor assembly 102, and in part by the particular field of view which is desired to be obtained.

Figure 4:
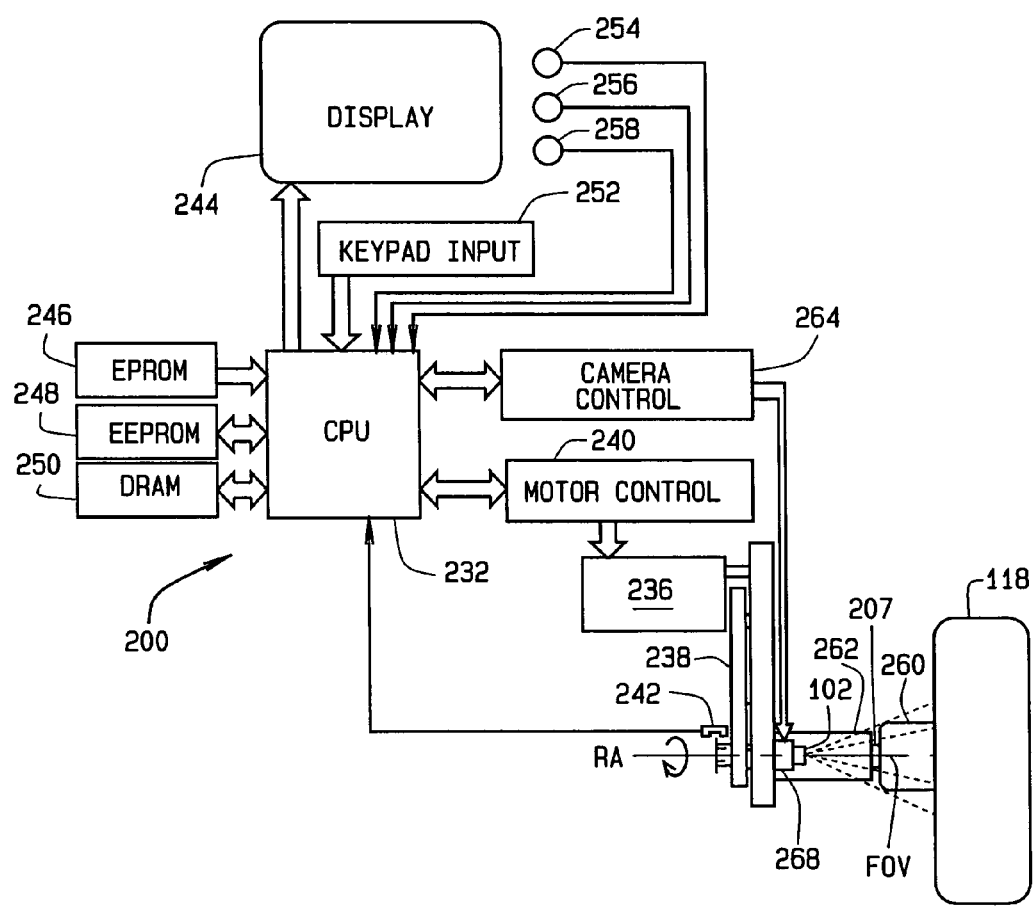
FIG. 4 is a combination diagrammatic plan view, block function diagram of a wheel balancer embodiment of the present invention.

In a first alternate embodiment of the present invention, shown in FIG. 4, a vehicle wheel balancer system 200 is configured with an imaging sensor assembly 102 disposed to view, along a field of view FOV, a portion of a vehicle wheel assembly 118 to be balanced. The vehicle wheel assembly 118 is mounted on a rotatable mounting shaft or spindle 207, which is driven by a bi-directional, multi-rpm, variable torque motor drive 236 through a belt 238. Operation of the motor drive 236 is controlled by a motor control unit 240, in response to signals received from the CPU 232. Mounted on one end of the spindle 207 is a conventional quadrature phase optical shaft encoder 242 which provides rotational position information to the balancer CPU 232. The CPU 232 capable of executing the balancer software and driving an optional display 244 or other interface configured to provide information to an operator. The CPU 232 is connected to EPROM program memory 246, EEPROM memory 248 for storing and retrieving non-volatile information such as calibration and vehicle specific specifications, and DRAM memory 250 for temporary data storage. Manual inputs for the present invention entail keypad entry 252 as well as optional digital rotary contacting encoders 254, 256, and 258, i.e. knobs.

Optionally, the CPU 232 of the vehicle wheel balancer system 200 is further configured to communicate with one or more additional vehicle services devices, such as a vehicle tire changer system 400, to exchange data therewith. For example, the vehicle wheel balancer system 200 may be configured to communicate one or more radial runout measurements acquired by the imaging sensor assembly 102 for a wheel assembly 118 to a vehicle tire changing system 400 for use during a subsequent tire mounting or dismounting procedure of that wheel assembly 118. Alternatively, the vehicle wheel balancer system 200 may be configured to store the acquired measurements or images either locally in an associated data storage 250, remotely over a data network, or in an data storage device associated with the wheel assembly 118 itself such as an radio-frequency identification device (not shown) which can be later accessed by another vehicle service device to retrieve the information.

During the operation of the vehicle wheel balancing system 200, a wheel assembly 118 under test is removably mounted on the spindle shaft 207 for rotation with a spindle hub 260 of conventional design. To determine wheel assembly 118 imbalances, the vehicle wheel balancer system 200 includes at least a pair of force transducers coupled to the balance structure 262. These sensors and their corresponding interface circuitry to the CPU 232 are well known in the art, such as seen in U.S. Pat. No. 5,396,436 to Parker et al., herein incorporated by reference, and thus are not shown.

Additionally shown in FIG. 4 is the inclusion of the control logic 264 for the imaging sensor assembly 102 in communication with the balancer CPU 232 for controlling the operation of an imaging sensor assembly 102. The imaging sensor assembly 102 is preferably housed in a self-contained housing 268, with a field of view FOV orientated towards a desired portion of the wheel assembly 118 mounted on the spindle 207.

Figure 5:
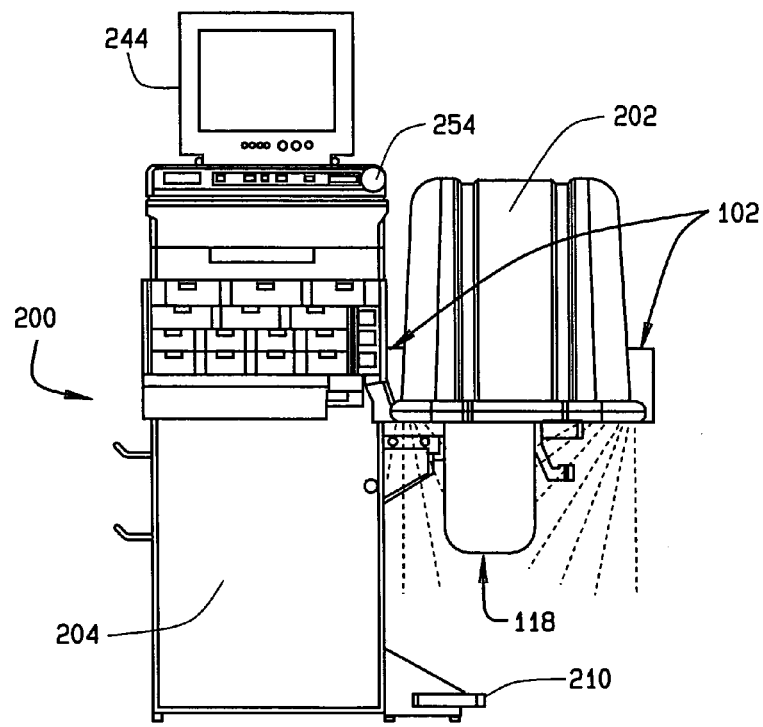
FIG. 5 illustrates a camera or imaging assembly placement location on the structure a vehicle wheel balancer.
Figure 6:
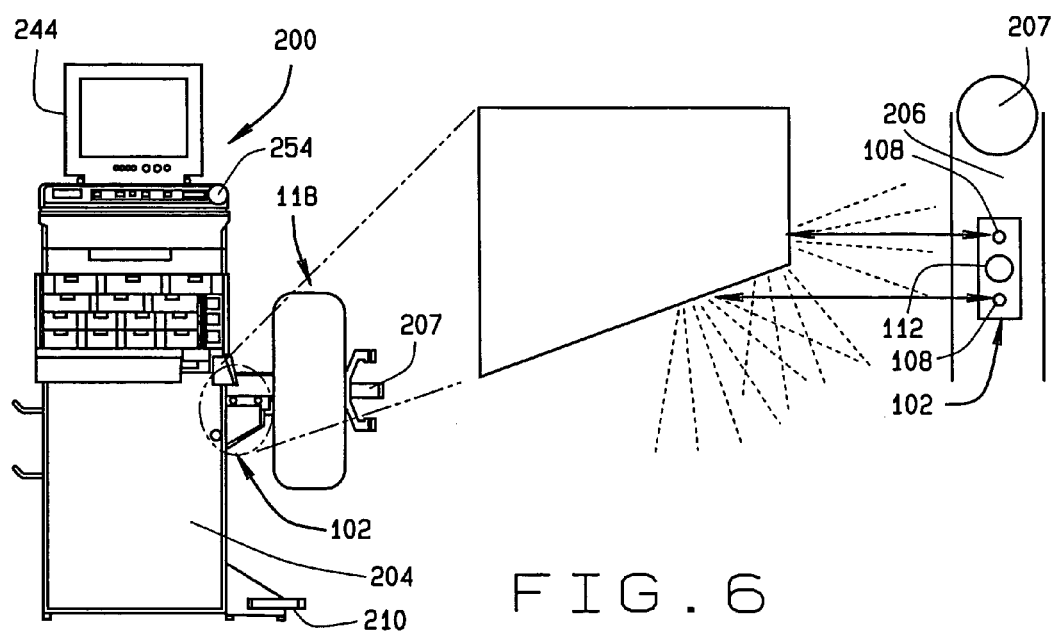
FIG. 6 illustrates an alternate camera or imaging assembly placement location on a vehicle wheel balancer spindle assembly.

For example, for an imaging sensor assembly 102 associated with a vehicle wheel balancer system 200 to include a field of view covering the portions of a vehicle wheel rim identified in FIG. 3A, there are several possible locations. As shown in FIG. 5, the imaging sensor assembly 102 could be mounted on the inside edge of a movable hood 202 or inside the balancer housing 204 using a hole (not shown) in the side of the housing 204 for optical energy transmission, on the spindle housing 206, adjacent the spindle shaft 207 as shown in FIG. 6, or on a post 208 displaced from the wheel balancer system 200 as shown in FIG. 7.

Mounting the imaging sensor assembly 102 adjacent the outboard portions of the hood 202, as shown in FIG. 5 provides the imaging sensor assembly 102 with a field of view FOV including the outer surfaces of the vehicle wheel rim 120, such as shown in FIG. 3C. Mounting the imaging sensor assembly 102 either adjacent the inboard portions of the hood 202, as shown in FIG. 5, or on the spindle housing 206 as shown in FIG. 6, provides the imaging sensor assembly 102 with a field of view including the inner surfaces of the vehicle wheel rim 120, such as shown in FIG. 3A, for a wide range of wheel rim configurations. Those of ordinary skill in the art will further recognize that the imaging sensor assembly 102 may be movable about one or more axis to increase the available field of view, or that multiple imaging sensor assemblies 102 may be utilized to accommodate a wider range of wheel rim configurations or provide coverage for multiple fields of view.

Optionally, with an imaging sensor assembly 102 mounted on the hood 202, a shutter mechanism (not shown) on the imaging sensor assembly 102 may be used to protect the camera or imaging assembly components from the harsh conditions of the hood environment when not in use.

Figure 7:
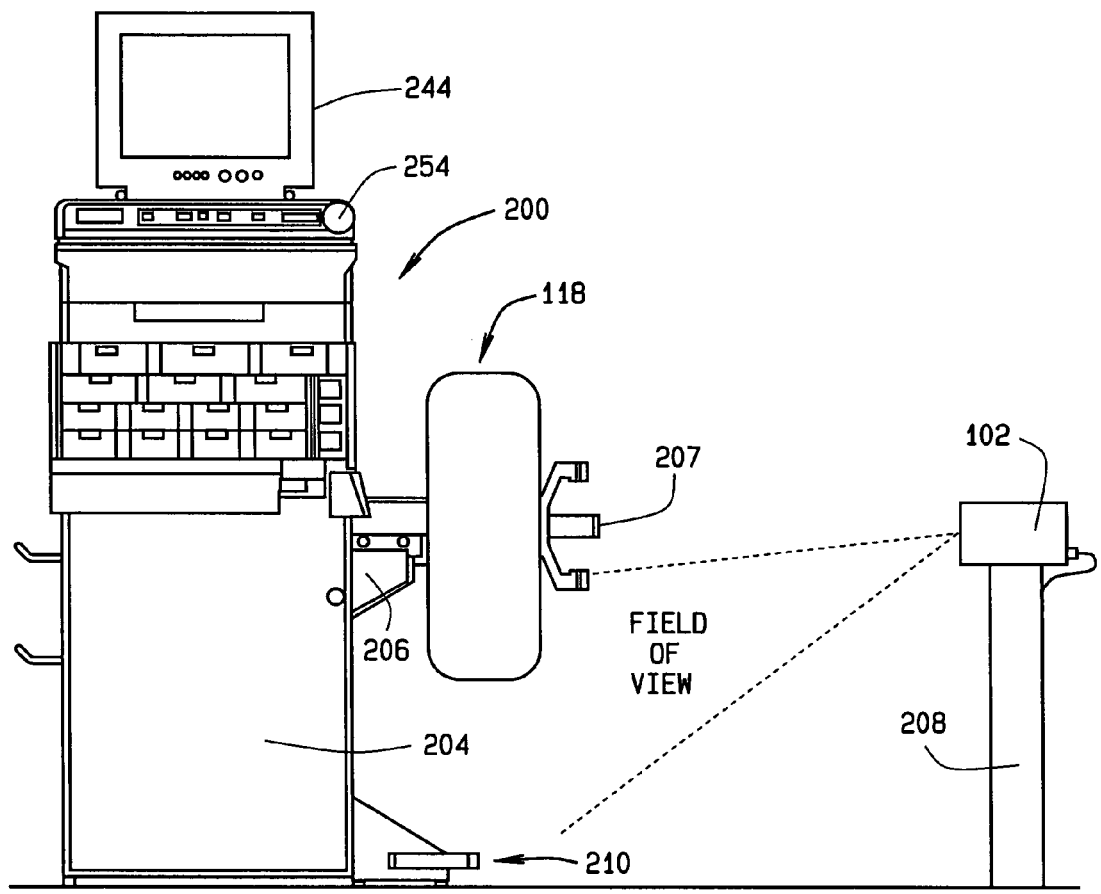
FIG. 7 illustrates an alternate camera placement location disposed remotely from the wheel balancer.
Figure 8:
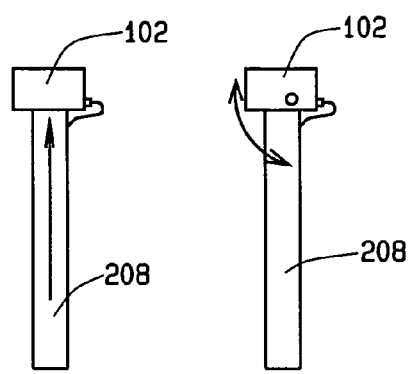
FIG. 8 illustrates two axis of movement for a camera or imaging assembly.

An alternative placement of the camera or imaging assembly to include the outer portions of a vehicle wheel rim 120 in a field of view, such as shown in FIG. 3C, requires a separate post 208 displaced from the vehicle wheel balancer system 200 on which the imaging sensor assembly 102 is disposed, as shown in FIG. 7. Placement on a post 208 provides advantages in the design of the imaging sensor assembly 102 components, such as the lens 112, accessibility to the imaging sensor assembly 102, and protection from the environmental conditions associated with the region around the hood 202 or spindle housing 206. Preferably, with an imaging sensor assembly 102 disposed on the separate post 208, the vehicle wheel balancer system 200 is secured to the floor or other stable structure such that the placement of the post 208 relative to the vehicle wheel balancer system 200 remains constant. Those of ordinary skill in the art will further recognize that the imaging sensor assembly 102 may be movable about one or more axis, such as shown in FIG. 8, to increase the available field of view, or that multiple imaging sensor assemblies 102, not limited to those disposed on posts 208, may be utilized to accommodate a wider range of wheel rim configurations or to provide multiple fields of view.

To provide a vehicle wheel service system 100, such as a vehicle wheel balancer 200 with an imaging sensor assembly 102 disposed to view the surfaces of a vehicle wheel rim 120 illustrated in FIG. 3B, there are a variety of locations at which the imaging sensor assembly 102 may be disposed. For example, the imaging sensor assembly 102 may be centrally disposed on an inner surface on the hood 202 of the balancer 200, orientated to look downward on the wheel rim 120, or on a floor surface below the spindle shaft 207, orientated to look upward on the wheel rim 120 mounted on the spindle shaft 207. Preferably, for an imaging sensor assembly 102 disposed in either of these locations, a shutter mechanism is utilized to protect the imaging sensor assembly 102 when not in use. An alternate configuration may employ two or more imaging sensor assemblies 102 mounted on opposed inner surfaces of the hood 202, each configured to view a diagonally opposite rim bead seat 128A, 128B of a wheel rim 120 disposed on the spindle shaft 207.

Figure 9:
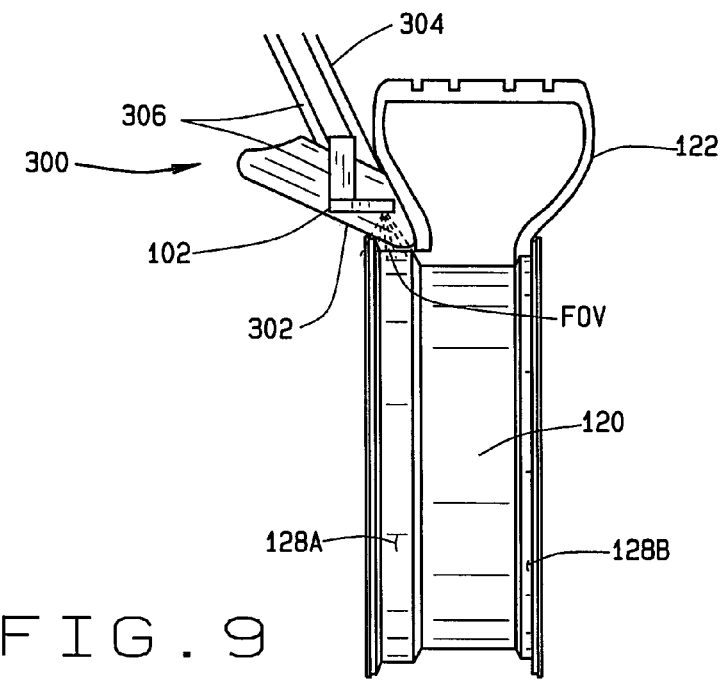
FIG. 9 is a sectional view of a tire bead roller and camera assembly separating a tire from a wheel rim.

A preferred location for an imaging sensor assembly 102 to view the surfaces of a vehicle wheel rim 120 as illustrated in FIG. 3B is on a tire bead removal arm 300 as shown in FIG. 9, associated with the vehicle wheel service system 100, which may be either a vehicle wheel balancer system 200, or a vehicle tire changing system 400. A tire bead removal arm 300 consists of tire bead breaker or bead roller 302 disposed for rotational movement at an end of an articulating support structure 304. The articulating support structure 304 is typically configured with mechanical, hydraulic, or pneumatic actuating mechanism (not shown) to engage the bead roller 302 with the side surface of a tire 122 disposed on a wheel rim 120, disengaging the tire 122 from the wheel rim bead seat 128A. Typically, a second tire bead removal arm is disposed adjacent an opposite side of the tire 122, to displace the opposite tire surface from the wheel rim bead seat 128B.

As illustrated in FIG. 9, an imaging sensor assembly 102 associated with the tire bead removal arm 300 is preferably coupled thereto by means of a bracket 306 which positions the imaging sensor assembly 102 adjacent the bead roller 302. In this configuration, the imaging sensor assembly 102 is provided with a field of view which includes the upper surface of the wheel rim bead seat 128A as the bead roller 302 displaces the tire 122. Typically, a bead roller 302 will displace a tire 122 two or more inches from the bead seat 128A. Continuous rotation of the wheel assembly 118 about the wheel axis as the bead roller 302 displaces the tire 122 from the circumference of the bead seat 128A provides an imaging sensor assembly 102 disposed with the proper field of view, a complete view of the entire circumferential surface of the bead seat 128A or 128B from which distance measurements can be acquired.

Figure 10:
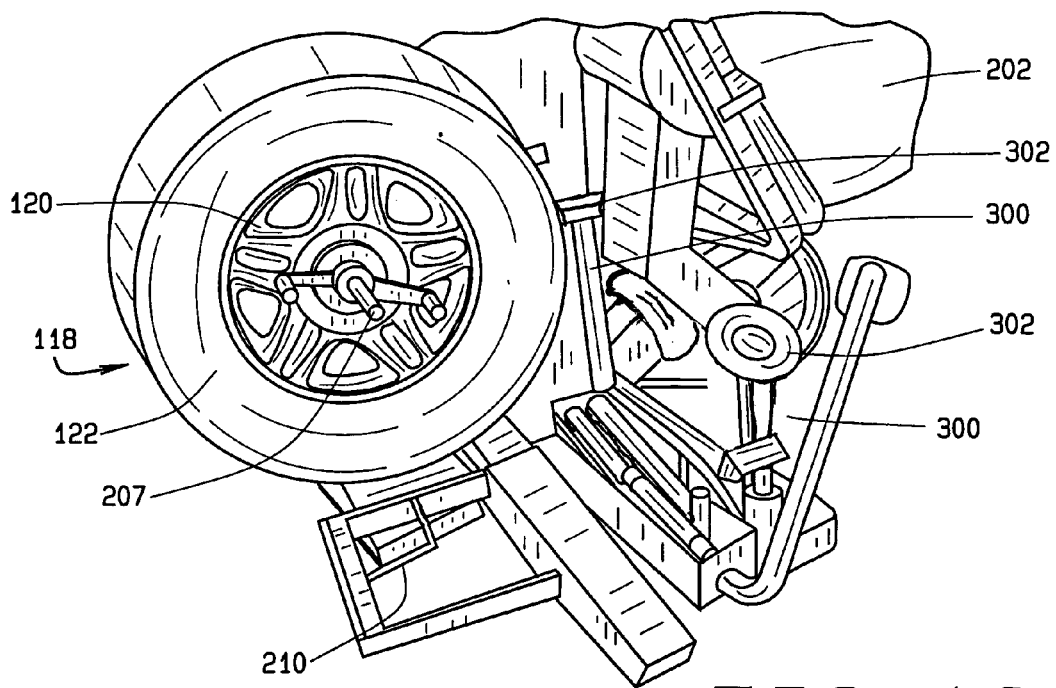
FIG. 10 is a perspective illustration of a pair of tire bead removal arms associated with a vehicle wheel balancing system.
Figure 11:
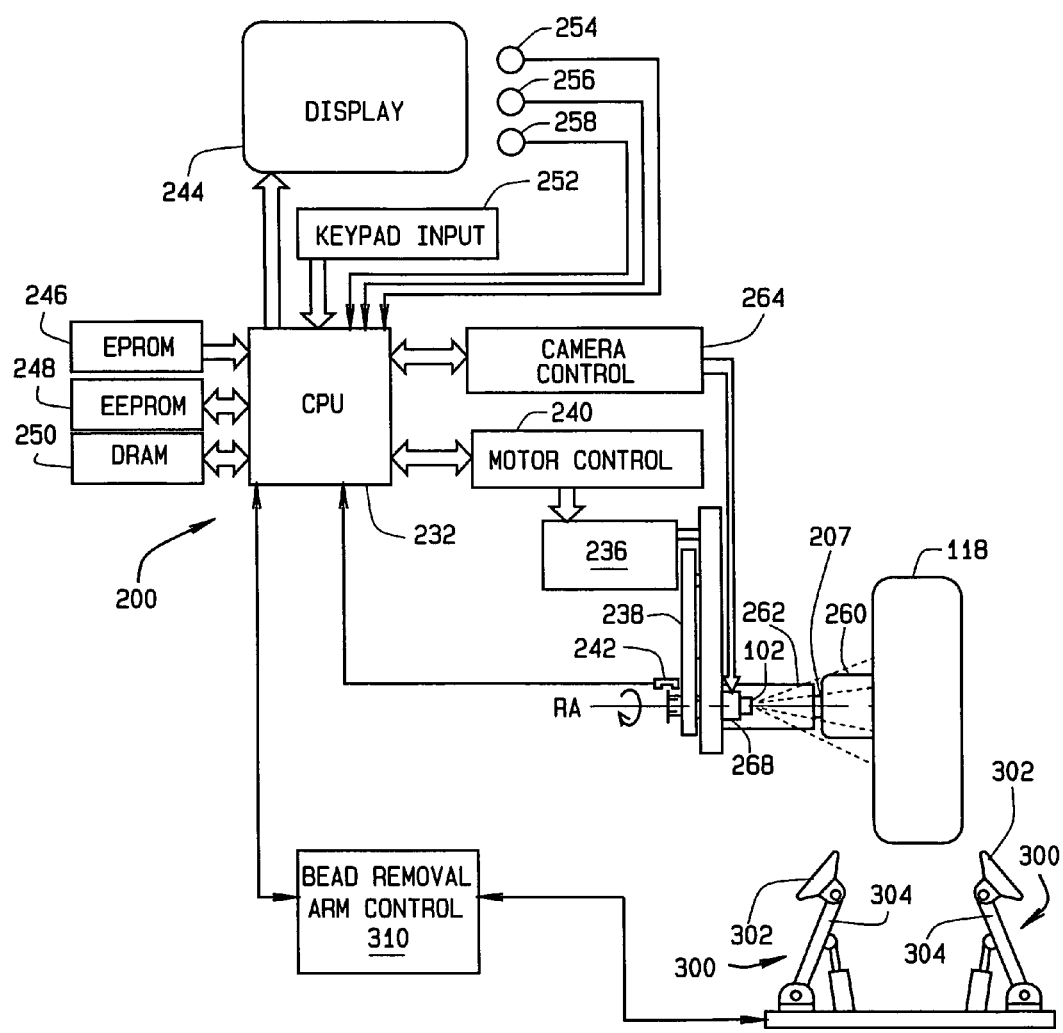
FIG. 11 is a combination partial diagrammatic plan view, partial block function diagram of the wheel balancer embodiment of the present invention shown in FIG. 10.

As shown in FIGS. 10 and 11, in an alternate configuration of the present invention, the vehicle wheel balancer system 200 is configured with a pair of tire bead removal arms 300 (one for each side of the tire 122) and an associated bead removal arm control unit 310 operatively coupled to the balancer CPU 232. Utilizing the tire bead removal arms 300, the vehicle wheel balancer system 200 can be configured to deflect the tire 122 inward from the edges 124 of the wheel rim 120, permitting a measurement device such as an imaging sensor assembly 102 to obtain a measure of the radial runout of the bead seat surfaces 128A, 128B, without requiring complete removal the tire 122 from the wheel rim 120.

Preferably, the measurement device is an imaging sensor assembly 102 mounted to each tire bead removal arm 300, as previously described. However, those of ordinary skill in the art will recognize that the use of the tire bead removal arms 300 permits other measurement devices to be associated with the vehicle wheel balancer system 200 to provide a measure of the tire bead seat surface radial runout, including, but not limited to, a potentiometer, a Hall effect sensor, an LVDT sensor, or a capacitor sensor.

During operation, once the tire bead removal arms 300 have unseated the tire 122 from the bead seat surfaces 128A, 128B, the imaging sensor assembly 102 is utilized to acquire distance information corresponding to radial runout measurements from the bead seat surfaces 128A, 128B. For example, as previously described, an imaging sensor assembly 102 associated with the tire bead removal arms 300 can obtain images of the bead seat surfaces 128A, 128B from which distance information can be extracted, identifying radial runout. Alternatively, a contact measurement device may be moved into position such that a roller or ball rests on the bead seat surfaces 128A, 128B as the wheel rim 120 is slowly rotated. Movement of the contact measurement device would be up and down responsive to the radial runout of the bead seat surfaces 128A, 128B as detected and measured by the measurement device.

Utilizing a vehicle wheel balancer system 200 configured with a pair of tire bead removal arms 300, the tire 122 and wheel rim 120 can be appropriately matched without dismounting the wheel assembly 118 from the balancer spindle 207. Maximum radial runout or maximum non-uniformity of the tire 122 may be acquired by the vehicle wheel balancer system 200 using a conventional method, and matched to the lowest point of radial runout of the wheel rim 120 as identified by the imaging sensor assembly 102 or contact measurement device. The pair of tire bead removal arms 300 are utilized to "break" the tire 122 loose from the wheel rim 120 and hold it in place, permitting the spindle shaft 207 to rotate the wheel rim 120 until the identified point of maximum radial runout on the tire 122 matches the identified point of minimum radial runout on the wheel rim 120.

Those of ordinary skill in the art will recognize that the vehicle wheel balancer system 200 may be further configured to measure lateral runout of the wheel rim 120 or tire assembly 118 utilizing an imaging sensor assembly 102 disposed in proximity to the wheel rim such that a portion of the wheel rim edge 124 is within the field of view of the imaging sensor assembly 102, or utilizing a ball or roller as previously described for radial runout measurements.

Figure 12:
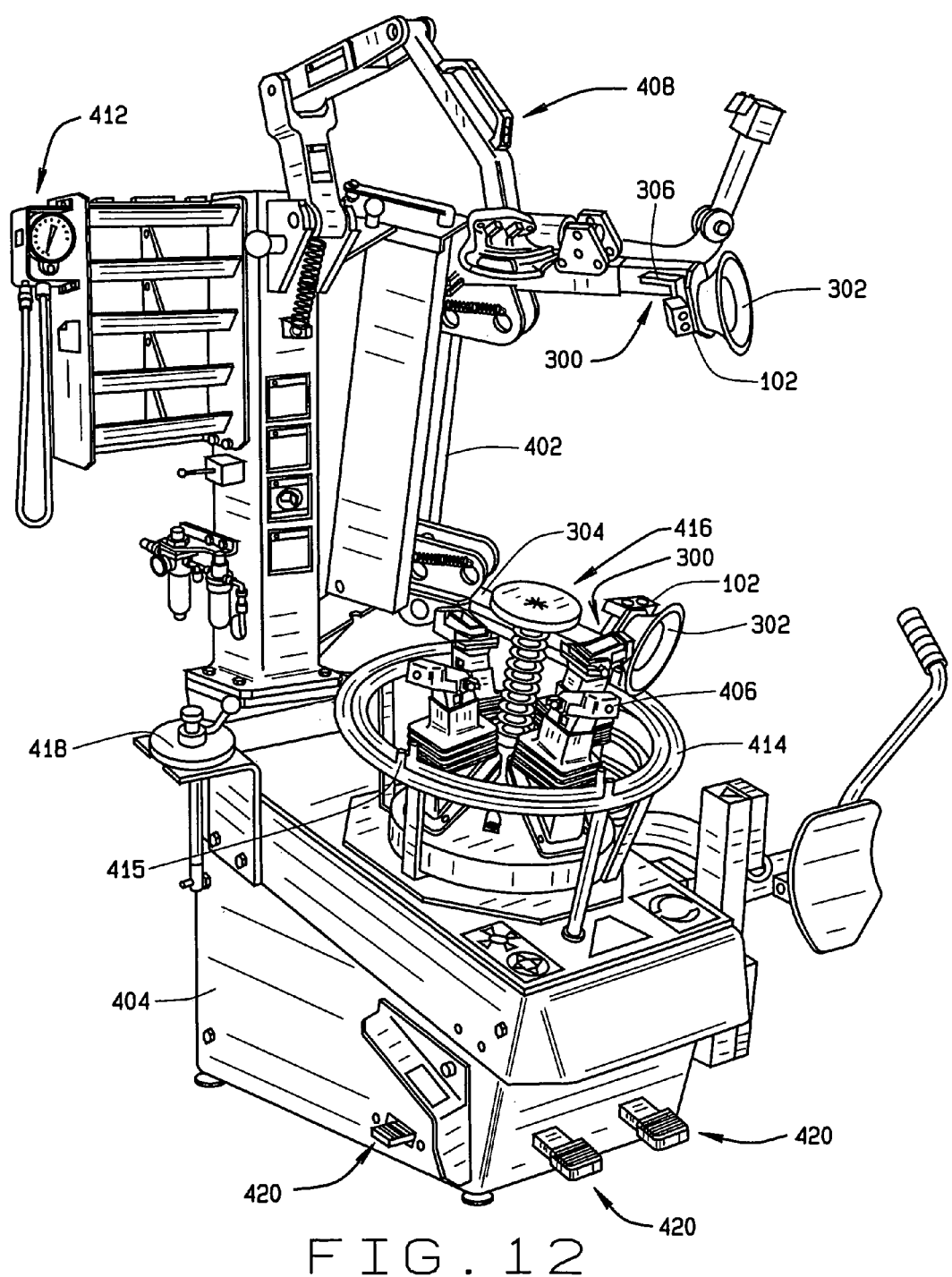
FIG. 12 is a perspective illustration of a vehicle tire changer system.
Figure 13:
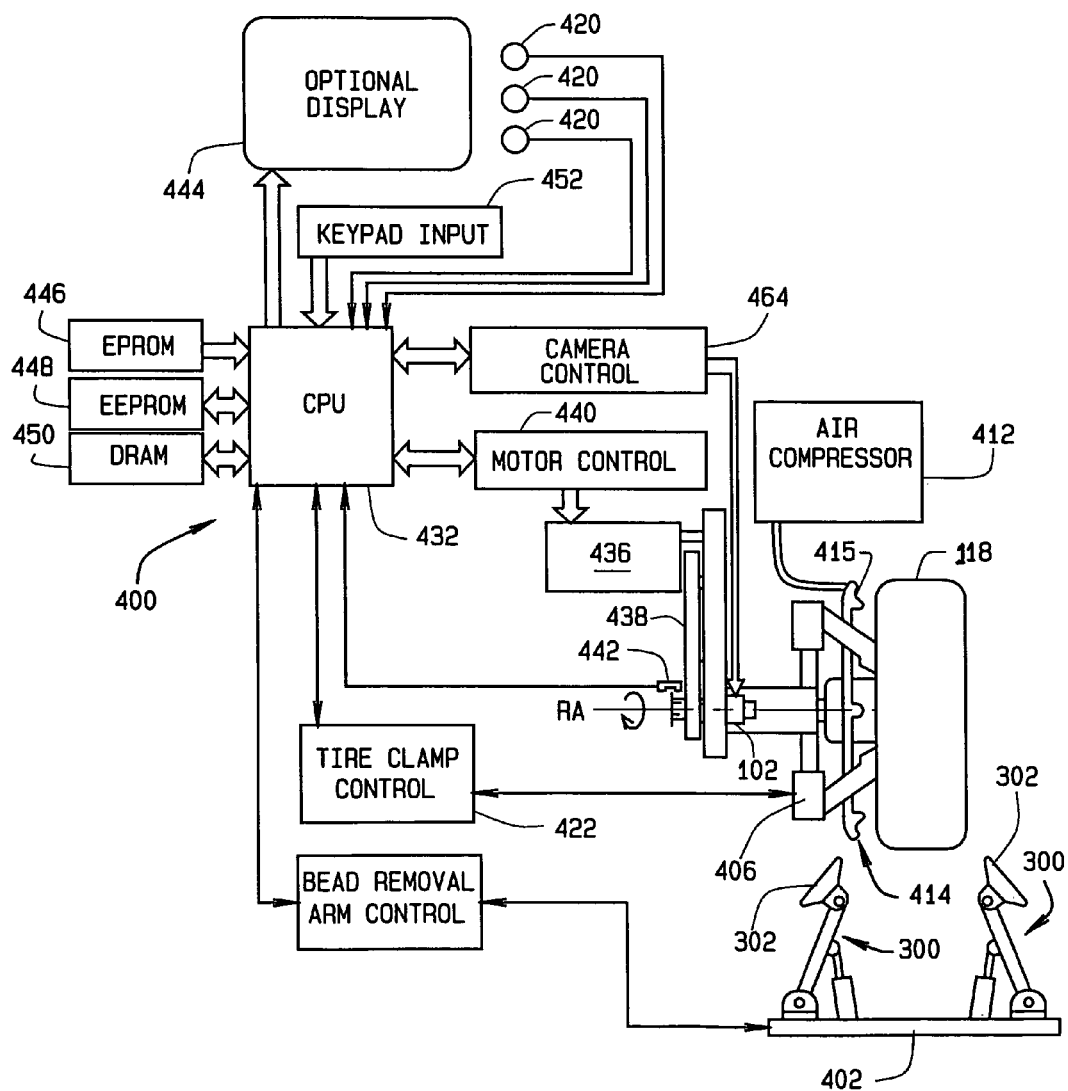
FIG. 13 is a combination partial diagrammatic plan view, partial block function diagram of a tire changer embodiment of the present invention.

In an alternate embodiment, a conventional vehicle tire changer system 400, such as illustrated in FIGS. 12 and 13 includes one or more imaging sensor assemblies 102, disposed with a field of view encompassing a wheel assembly 118, such as on the associated tire bead removal arms 300. Preferably, as illustrated in FIG. 12, the conventional tire bead removal arms 300 are coupled to a bead roller assembly 402 secured to the base 404 of the tire changer system 400. A conventional tire clamping device 406 is additionally disposed on the base 404, and is configured to secure a wheel assembly 118 in a generally horizontal position between the upper and lower tire bead removal arms 300. A conventional articulating tire mount/demount arm assembly 408 is further coupled to the base 404, and includes a tire mount/demount head 410 configured to assist in installation or removal of a tire 122 from a wheel rim 120. A number of conventional accessory items such as a compressed air inflation assembly 412, tire air inflation ring 414, a wheel centering support 416, and removable wheel securing device 418 are associated with the tire changer system 400. Similar, a number of foot activated control pedals 420 are provided.

For some tire and rim combinations it is necessary for the tire changer system 400 to use a high pressure blast of air from the tire air inflation ring 414 between the rim 120 and the tire 122 to assist in seating the tire 122 on the bead seat surfaces 128A, 128B. The blast of air causes the tire sidewalls to expand such that the tire 122 makes a seal with the wheel rim 120 close to, if not on, the bead seat surfaces 128A, 128B. This is necessary for filling the wheel assembly 118 with air until the tire 122 is seated into the bead seat surfaces 128A, 128B. The imaging sensor assembly 102 is optionally utilized to acquire one or more dimensional measurements of the vehicle wheel rim 120 which are subsequently utilized by the tire changer system 400 to determine a need for an air blast, and to alter the position or orientation of the individual nozzles 415 on the tire air inflation ring 414 to accommodate wheel rims 120 of different sizes.

In the tire changing system 400, the vehicle wheel assembly 118 to be dismounted or mounted is secured to on a rotating shaft 401 by a set of wheel clamps 406. The shaft 401 is driven by a motor drive 436 through a belt 438. Operation of the motor drive 436 is controlled by a motor control unit 440, in response to signals received from the CPU 432. The CPU 432 similarly controls the operation of the wheel clamps 406 through a tire clamp control unit 433. Mounted on one end of the shaft 401 is a conventional shaft encoder 442 which provides rotational position information to the tire changer CPU 432. The CPU 432 is preferably capable of executing tire changer operations software and driving an optional display 444. The CPU 432 is connected to EPROM program memory 446, EEPROM memory 448 for storing and retrieving non-volatile information such as vehicle wheel specific specifications, and DRAM memory 450 for temporary storage. Manual inputs for the present invention may entail a keypad entry 452 as well as control pedals 420.

Additionally shown in FIG. 13 is the inclusion of camera control logic 464 in communication with the tire changer CPU 432 for controlling the operation of an imaging sensor assembly 102. The imaging sensor assembly 102 is preferably disposed with a field of view towards a portion of the wheel assembly 118 mounted on the shaft 401, such that the imaging sensor assembly 102 can acquire images of the tire bead seat surfaces 128A, 128B when exposed by the bead removal arms 300

Optionally, the CPU 432 of the tire changer system 400 is further configured to communicate with one or more additional vehicle services devices, such as a vehicle wheel balancer 200, to exchange data therewith. For example, the tire changer system 400 may be configured to communicate one or more radial runout measurements acquired by the imaging sensor assembly 102 for a wheel assembly 118 to a vehicle wheel balancer system 200 for use during a subsequent balancing procedure of that wheel assembly 118. Alternatively, the tire changer system 400 may be configured to store the acquired measurements or images either locally in an associated data storage 450, remotely over a data network, or in an data storage device associated with the wheel assembly 118 itself such as an radio-frequency identification device (not shown) which can be later accessed by another vehicle service device to retrieve the information.

Providing a vehicle wheel service system 100 such as a vehicle balancing system 200 or a vehicle tire changer system 400 with a pair of tire bead removal arms 300 configured with associated imaging sensor assembly 102 facilitates automation of the tire bead seat breaking process by utilizing images and distance measurements obtained from the imaging sensor assembly 102 to locate the tire bead removal arms 300 relative to the wheel assembly 118, and in particular, to locate bead rollers 302 relative to the junction between the tire 122 and wheel rim 120. The images and distance measurements acquired from the imaging sensor assembly 102 preferably provide feedback utilized by the vehicle wheel service system 100 to control movement of the pair of tire bead removal arms 300, and to guide the bead rollers 302 into the appropriate junction for displacement of the tire 122 from the bead seat surfaces 128A, 128B. Once the bead rollers 302 are positioned, the imaging sensor assembly 102 is utilized along with conventional location and pressure sensors associated with the tire bead removal arms 300 to unseat the tire 122 from the rim bead seat surfaces 128A, 128B.

A problem which is encountered during displacement of a tire 122 from the rim bead seat surfaces 128A, 128B on a wheel rim 120 is the placement of pressure sensors 500 installed within the tire assembly 118 for monitoring air pressure. When the tire 122 is unseated from the rim bead seat surface 128A, 128B, care must be taken not to damage the sensor mounted inside the rim 120. It is known that particular types of sensors are only installed on wheel rims 120 having predetermined configurations. Accordingly, images of a wheel rim 120 acquired by the imaging sensor assembly 102 may be compared with a database of predetermined wheel rim profiles to determine if a sensor is likely to be disposed within the wheel assembly 118.

In a first alternative method, once the tire bead removal arms 300 of a vehicle wheel service system 100 have unseated the tire 122 from the bead seat surfaces 128A, 128B, a properly positioned imaging sensor assembly 102 associated with the vehicle wheel service system 100 could "take a look" under the exposed edge of the tire 122 to measure a distance to the opposite side of the tire 122. If the distance is observed to be constant about the circumference of the wheel assembly as it is rotated past the imaging sensor assembly 102, then there is no sensor. If, however, the distance is measured to be shorter in one spot about the circumference of the wheel rim 118, then a sensor or other obstruction location has been identified.

In a second alternative method, standardized markings disposed on the surface of the tire 122 may be observed by an imaging sensor assembly 102, and compared against a predetermined database of standardized tire markings to indicate the presence and type of sensor disposed within the wheel assembly 118.

For example, emergency run-flat tires which are capable of supporting the weight of a vehicle with little or no air pressure are typically marked with an "EMT" standardized tire marking, and contain a valve-type sensor. When an image of the EMT standardized tire marking acquired by an imaging sensor assembly 102 is compared to the predetermined database of standardized tire markings, the vehicle wheel service system 100 can identify that an EMT tire 120 typically includes a valve type sensor in the wheel assembly 118. Utilizing this information, the vehicle service system 100 may be further configured to identify the location of the tire valve stem 136 from images acquired by the imaging sensor assembly 102, and to minimize deflection of the tire 122 from the bead seat surfaces 128A, 128B, in locations at or adjacent to the valve stem 136 to avoid damage to the sensor.

Location of the valve stem 136 or other index markings in an image acquired by the imaging sensor assembly 102 may be further utilized by the vehicle wheel service system 100. As a general rule the tire 122 dismount from the wheel rim 120 should not start at the tire valve stem 136. Accordingly, after identifying the location of the valve stem 136, the vehicle wheel service system is configured to rotate the wheel assembly 118 such that the tire bead removal arms 300 do not bring the bead rollers 302 into contact with the wheel assembly 118 adjacent the valve stem 136.

Figure 14:
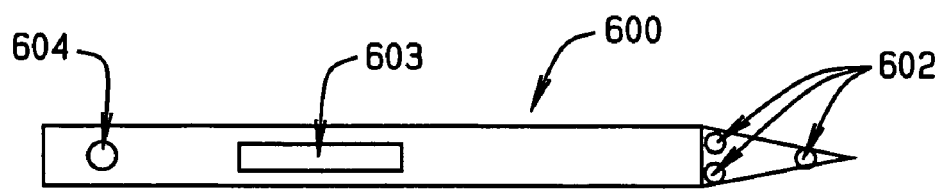
FIG. 14 illustrates one embodiment of a weight position indicator wand.

In an alternate embodiment of the present invention, a vehicle wheel balancer system 200 may be configured with an imaging sensor assembly 102 disposed to facilitate the selection and placement of imbalance correction weights on a vehicle wheel assembly 118 to correct a detected imbalance. An operator identifies an axial location within a wheel rim 118 at which imbalance correction weight placement is desired. The operator may identify this location utilizing an object which is sufficiently identifiable by the imaging sensor assembly 102 such that a distance measurement to the indicated placement location may be acquired. For example, the operator may utilize a finger or a specialized pointing device such as a laser pointer or a wand 600 configured with a known target 602. The wand 600, such as shown in FIG. 14, may include a set of LEDs as a known target, powered by a battery 603. The location of the indicating object is acquired by the imaging sensor assembly 102 in response to an operator's command. For example, the operator may step on a foot pedal 210, or press an activation button 604 on the wand 600.

Once the vehicle wheel balancing system 200 has identified the weight placement locations, the vehicle wheel balancer system 200 determines a corresponding imbalance correction mode. For instance, if only one imbalance correction weight placement location is identified, the operator has chosen a static imbalance correction mode. If two identified imbalance correction weight locations are identified which are not on edge 124 of the wheel rim 120, the operator has chosen a dynamic adhesive weight imbalance correction mode. Preferably, the vehicle wheel balancing system 200 further analyzes, using images acquired from the imaging sensor assembly 102, the identified imbalance correction weight placement location to identify possible imbalance correction weight placement obstructions on the wheel rim 120. If an obstruction is identified, the vehicle wheel balancing system 200 is configured to calculate one or more new imbalance correction weight sizes and placement locations which will avoid the obstruction. Alternatively, if the operator identifies an axial imbalance correction weight placement location behind the spokes 132 of the wheel rim 120, the vehicle wheel balancing system identifies this "special" location and again calculates one or more imbalance correction weight sizes and locations which are hidden behind adjacent wheel spokes 132.

Figure 15:
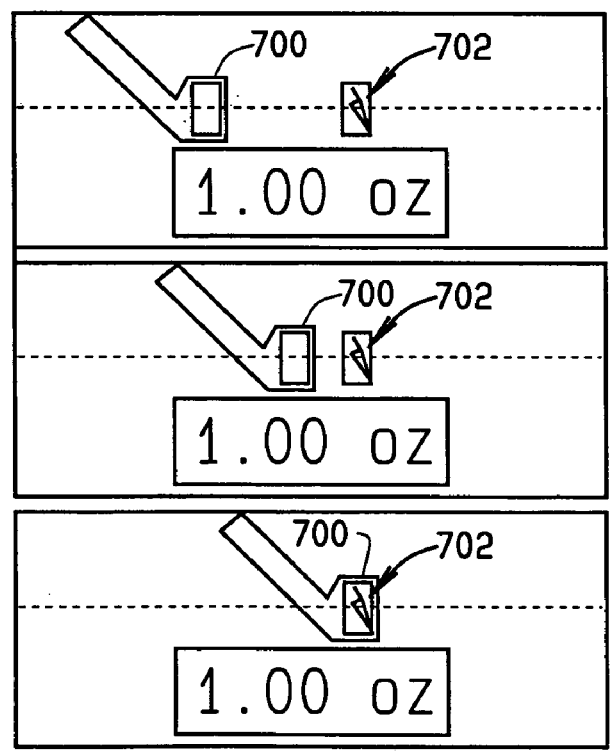
FIG. 15 illustrates a sequence of displayed weight placement assistance screens.

In an alternative embodiment of the present invention associated with a vehicle wheel balancing system 200, the imaging sensor assembly 102 is utilized to provide assistance to an operator during the placement of imbalance correction weights on a wheel assembly 118 to correct a detected imbalance. The imaging sensor assembly 102 is utilized to observe the operator's action of placing the imbalance correction weight, either by the operator's hand movement, the use of an conventional imbalance correction weight carrying arm, or a wand 600 configured to hold an imbalance correction weight thereon for placement, and to provide the operator with feedback such as visual and/or audio guidance as to where to locate the adhesive weight. For example, as illustrated in FIG. 15, visual feedback may include a sequence of images illustrating the distance between the current location of the imbalance correction weight 700 and the desired placement location 702.

An additional problem which may occur during imbalance measurement of a vehicle wheel assembly 118 is improper mounting of the wheel assembly 118 on the spindle shaft 207 of the vehicle wheel balancing system 200. In an alternate embodiment of the present invention, improper mounting may be detected by an imaging sensor assembly 102 configured to measure radial runout of the wheel rim bead seat surfaces 128A, 128B by observing both bead seat surfaces 128A and 128B moving radially or axially in unison. The vehicle wheel balancing system 200 is configured to display a diagnostic message cautioning the operator to check the mounting of the wheel assembly 118 in the event such conditions are detected.

Those of ordinary skill in the art will recognize that the advantages of providing a vehicle wheel service systems such as a vehicle wheel balancing system or a vehicle tire changing system with an imaging sensor assembly 102 capable of providing three-dimensional measurement information are not limited to the embodiments disclosed herein, and that additional features of conventional vehicle wheel balancing systems or vehicle tire changing systems may be improved or supplemented with three-dimensional measurement information acquired by such an imaging sensor assembly 102 within the scope of this invention.

The present invention can be embodied in-part in the form of computer-implemented processes and apparatuses for practicing those processes. The present invention can also be embodied in-part in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in-part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. An improved vehicle wheel balancer system having a central processing unit and configured with a rotating support structure to support a vehicle wheel assembly during a vehicle wheel balancing procedure, the improvement comprising:

an imaging sensor assembly disposed to acquire at least one optical image of a three-dimensional surface region of the vehicle wheel rim, said optical image consisting of a two dimensional array of pixel elements representing said three-dimensional surface region; and wherein the central processing unit is configured to receive said acquired optical images from said imaging sensor assembly, and to utilize during a wheel balancing procedure, at least one distance measurement identified from said acquired optical image and which is associated with said imaged portion of said surface region of the vehicle wheel rim.

2. The improved vehicle wheel balancer system of claim 1 wherein the central processing unit is further configured to utilize said distance measurement to identify a profile of the vehicle wheel rim in said imaged surface region.

3. The improved vehicle wheel balancer system of claim 1 wherein said central processing unit is further configured to utilize said distance measurement to calculate radial runout about a circumference of a tire bead seat surface of the vehicle wheel rim.

4. The improved vehicle wheel balancer system of claim 1 wherein said central processing unit is further configured to utilize said distance measurement to calculate lateral runout about a circumference of the vehicle wheel rim.

5. The improved vehicle wheel balancer system of claim 1 wherein the central processing unit is further configured to utilize said distance measurement to identify a miss-centered mounting of the vehicle wheel rim on a rotating support structure.

6. The improved vehicle wheel balancer system of claim 1 wherein the central processing unit is further configured to utilize said distance measurement to identify at least one feature of the vehicle wheel rim, said at least one identified feature selected from a set of features which includes at least a spoke configuration and a spoke profile.

7. The improved vehicle wheel balancer system of claim 1 wherein the central processing unit is further configured to utilize said distance measurement to identify a wheel rim edge profile in said imaged surface region.

8. The improved vehicle wheel balancer system of claim 1 wherein the central processing unit is further configured to utilize said distance measurement to identify the presence of an imbalance correction weight installed on the vehicle wheel rim in said imaged surface region.

9. The improved vehicle wheel balancer system of claim 1 wherein the central processing unit is further configured to utilize said distance measurement to identify the presence of a wheel rim surface defect in said imaged surface region.

10. The improved vehicle wheel balancer system of claim 1 wherein the central processing unit is further configured to utilize said distance measurement to select at least one imbalance correction weight placement location on the vehicle wheel rim in said imaged surface region.

11. The improved vehicle wheel balancer system of claim 1 wherein the central processing unit is further configured to utilize said distance measurement to alter a configuration of one or more components of the improved vehicle wheel service system.

12. An improved wheel parameter measurement apparatus for a dynamic wheel balancer having a spindle shaft for mounting a vehicle wheel assembly consisting of at least a vehicle wheel rim for rotation thereon, the improvement comprising:

an optical energy sensing means for receiving reflected optical energy from an area of the vehicle wheel rim on the spindle, and for generating a two-dimensional image of said detected optical energy, said two-dimensional image composed of a plurality of image pixels; and a processing means for receiving said images generated by said optical energy sensing means to extract data relating to at least one feature of the wheel rim.

13. The improved wheel parameter measurement apparatus of claim 12 wherein said extracted data identifies a feature location on the mounted wheel rim.

14. The improved wheel parameter measurement apparatus of claim 12 wherein said extracted data identifies a feature dimension on the mounted wheel rim.

15. The improved wheel parameter measurement apparatus of claim 12 wherein said extracted data identifies a configuration of said at least one feature on the mounted wheel rim.

16. A method for characterizing at least one feature of a vehicle wheel assembly consisting of at least a vehicle wheel rim where the vehicle wheel assembly is mounted for rotational movement about an axis on a vehicle wheel balancer system comprising the steps of:

detecting reflected optical energy from a three-dimensional area of the vehicle wheel rim;

generating a two-dimensional image of said three-dimensional area of the vehicle wheel rim from said detected optical energy, said two-dimensional image composed of a plurality of image pixels;

processing said generated image to extract data associated with at least one feature of the vehicle wheel rim; and utilizing said extracted data during a wheel imbalance service procedure.

17. The vehicle wheel balancer system of claim 1 wherein said imaging sensor assembly is configured to acquire stereoscopic images of said portion of the vehicle wheel rim.

18. The improved wheel parameter measurement apparatus of claim 12 wherein said optical energy sensing means is configured to acquire stereoscopic images of said area of the vehicle wheel rim.

* * * * *